Patented May 18, 1954

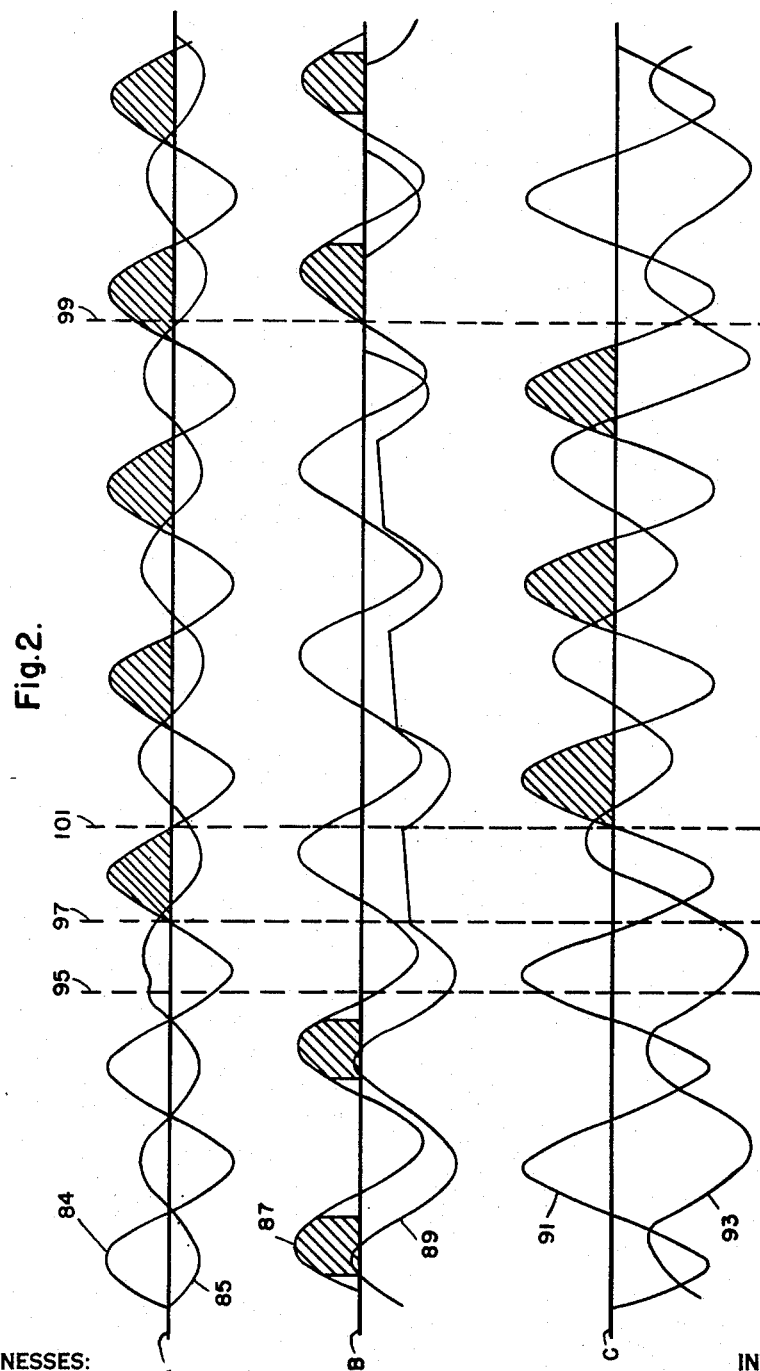

2,679,021

UNITED STATES PATENT OFFICE 2,679,021

ELECTRIC TIMER

Edward C. Hartwig and Robert F. Barrell, Lancaster, N. Y., assignors to Westinghouse Electric Corporation, East Pittsburgh, Pa., a corporation of Pennsylvania Application May 5, 1950, Serial No. 160,342

16 Claims. (Cl. 315—230)

Our invention relates to electronic circuits and particularly to circuits for controlling the flow of current time for welding apparatus.

In industry the need frequently arises for bench welders of relatively simple structure and low cost which are capable of supplying accurately timed welding current impulses of precisely predetermined magnitude. Control circuits for achieving this precision control constructed in accordance with the teachings of the prior art, of which we are aware, are referred to as synchronous-precision welders. Such circuits provide for the firing of the tube through which the welding current is transmitted in accurate synchronism with the supply and are relatively complex. These circuits include a large number of timing valves and control valves, and transformers, relays and other costly circuit components. They are far too complex and costly for use in the control of a bench welder.

It is accordingly a specific object of our invention to provide a low cost synchronous precision control for a bench welder.

A general object of our invention is to provide a control circuit which employs a simple circuit to control precisely the flow of current during a predetermined period of time.

It is a further object to provide an inexpensive timer which shall be capable of accurately measuring a predetermined time interval.

Our invention contemplates the provision of a control circuit including only two valves in addition to the main valves associated directly with the welder. These two valves perform the timing and synchronizing functions. One of the two valves is normally conductive and performs the timing function. The other is non-conductive and when rendered conductive operates to render the timing valve non-conductive. While the timing valve is conductive, it operates to block the flow of load current; when it becomes non-conductive, it permits load current to flow. While the timing valve is conductive it charges a capacitor which biases off the main valves. When the timing valve is rendered non-conductive the capacitor begins to discharge and at the same instant the main valves fire. The load current continues to flow while a capacitor in a time constant circuit discharges. At the end of a predetermined time after the control valve becomes non-conductive, the capacitor in the time constant circuit is sufficiently discharged to allow the control valve again to become conductive and block the flow of load current.

The timing valve is preferably a thyratron. Therefore it is rendered non-conductive at the end of one of the half periods of the power supply—that is in precise synchronism with the supply. The timing is then determined by the resistor through which the capacitor is discharged. The resistor may be properly selected so that the timing is accurate.

The novel features that we consider characteristic of our invention are set forth with particularity in the appended claims. The invention itself, both as to its organization and its method of operation together with additional objects and advantages thereof will best be understood from the following description of a specific embodiment thereof, when read in connection with the accompanying drawings, in which:

Fig. 2 shows the voltage relation that exists during circuit operation.

Figure 1:
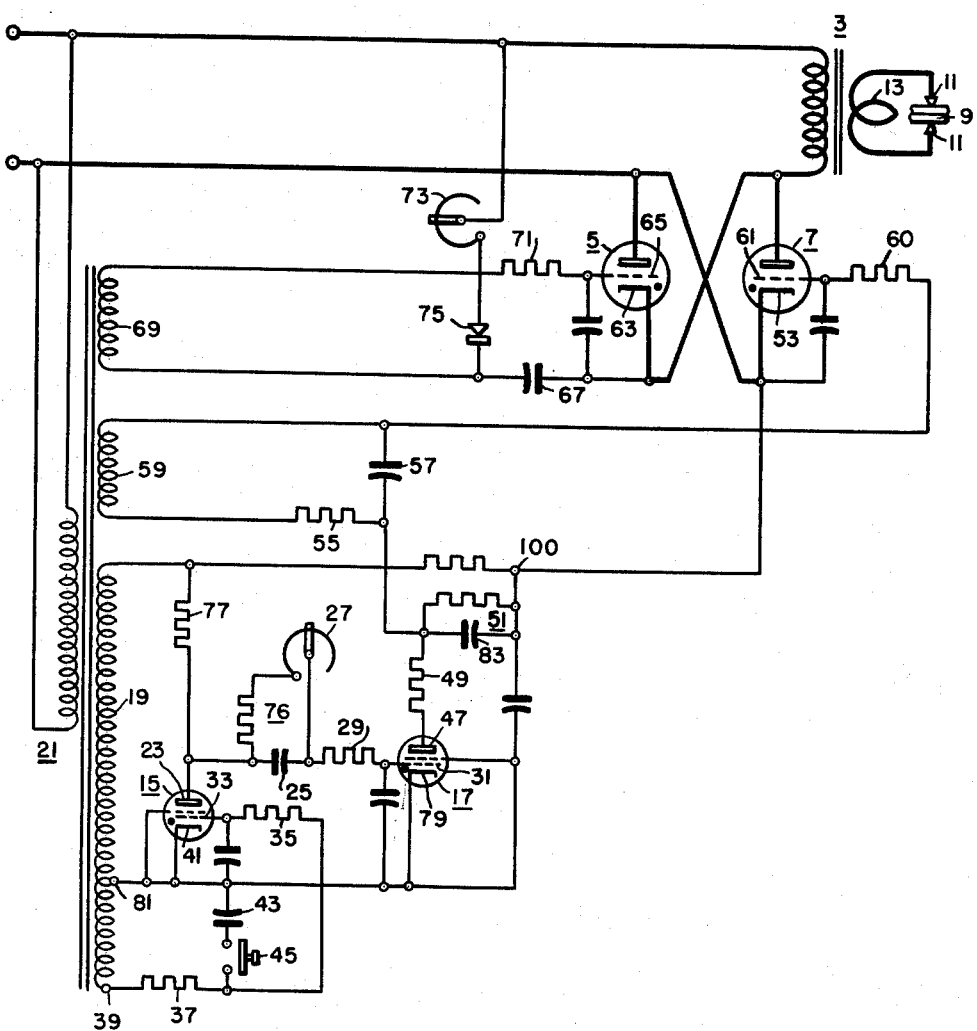
Figure 1 shows a schematic drawing of one embodiment of our invention.

Figure 1 of the drawings shows a welding transformer 3 connected through inverse parallel-connected thyratrons 5 and 7 to a source of power. The material 9 to be welded is placed between the electrodes 11 connected to the secondary 13 of the welding transformer 3. A start valve 15 and a control valve 17 are connected across a portion of the secondary 19 of a control transformer 21.

While the main valves in the apparatus shown in Fig. 1 are thyratrons, they may, in accordance with the broader aspects of our invention, also be ignitrons. In such a situation, firing thyratrons are interposed in the usual manner between the ignitrons and the timing components.

The anode 23 of the start valve 15 is connected through a capacitor 25 and rheostat 27 in parallel and a grid resistor 29 to the control grid 31 of the control valve 17. The control grid 33 of the start valve 15 is connected through two resistors 35 and 37 to one terminal 39 of the control transformer 21. The cathode 41 of the start valve 15 is connected through a capacitor 43 and a start switch 45 to the resistor 37. The anode 47 of the control valve 17 is connected through a resistor 49 and a time constant circuit 51 and junction 100 to the cathode 53 of one of the power thyratrons 7. A resistor 55 and a capacitor 57 in series are connected across a secondary 59 on the control transformer 21. One end of the time constant circuit 51 is connected through a resistor 55, a secondary 59 on the control transformer 21 and a grid resistor 60 to the control grid 61 of one of the power thyratrons 7.

The circuit between the cathode 63 and grid 65 of the other power thyratron 5 can be traced through a capacitor 67, a second secondary 69 on the control transformer 21 and a grid resistor 71 to the grid 65 of the power thyratron 5. One line from the source of voltage is connected through a variable resistor 73 and a rectifier 75 to a point between the capacitor 67 and the second secondary 69 of the control transformer 21.

Initially, the control valve 17 is conductive but the other valves 5, 7 and 15 are non-conductive. The voltage impressed on the grid of the start valve 15 is 180° out of phase with its anode voltage. Valve 7 is held non-conductive by the charge across capacitor 83. Valve 5 is held non-conductive by the charge across capacitor 67. Capacitor 67 is charged by grid rectified current from secondary 69 of transformer 21. The capacitor 25 in the first time constant circuit 76 has been charged through a circuit from the upper terminal of the first secondary 19 of the control transformer 21 through a resistor 77, the capacitor 25, the grid resistor 29, the grid 31 and cathode 79 of the control valve 17 to the midpoint 81 of the first secondary 19 of the control transformer 21.

To initiate operation of the control system, the start switch 45 is closed. The switch 45 then connects a phase shift circuit consisting of the capacitor 43 and resistor 37 between a portion of the first secondary 19 of the control transformer 21 and the grid 33 of the start valve 15. The capacitor 25 in the first time constant circuit 76 is fully charged in stand-by conditions, its right-hand plate being negative and its left-hand plate positive. Closure of the start switch 45 shifts the phase of the voltage on the grid 33 of the start valve 15 and the grid 33 periodically becomes sufficiently positive during the positive half cycle of the voltage between the anode and cathode 41 of the start valve 15 to cause the start valve 15 to become conductive during each positive half cycle. This phase shifted voltage on the grid 33 of tube 15 is such that the tube 15 must fire at the same point in each positive half cycle. This insures accuracy in the timing circuit. When the start valve 15 becomes conductive, the voltage across it drops appreciably making more negative the positive terminal of the capacitor 25 in the first time constant circuit 76. The grid 31 of the control valve 17 is then negative with respect to the cathode 79 and the control valve 17 is extinguished.

Prior to closure of the start switch 45, the control valve 17 has charged the capacitor 83 in the second time constant circuit 51. When valve 17 is extinguished, the capacitor 83 discharges and allows the second secondary 59 on the control transformer 21 to cause the power thyratron 7 to become conductive at a predetermined instant early in each positive half-cycle. When the power thyratron 7 becomes conductive, it passes current through the primary of the welding transformer 3.

A voltage is impressed across the primary of the welding transformer 3 and across the rheostat 73 and rectifier 75 connected in parallel therewith. The rectifier 75 charges the capacitor 67 in the control circuit of the second power thyratron 5 during each half-cycle during which the first power thyratron is conductive. The voltage then impressed across this capacitor 67 is sufficient to overcome the negative bias afforded by the third secondary 69 of the control transformer 21 and the second power thyratron 5 becomes conductive early in each positive half-cycle of the voltage between its anode and cathode. Thus, the second power thyratron 5 is fired by a follow-up circuit responsive to firing of the first thyratron 7. This arrangement enables full cycling operation which prevents saturation of the welding transformer 3.

At the end of a predetermined time after the control valve 17 becomes non-conductive to allow the power thyratrons 5 and 7 to become conductive, the capacitor 25 in the first time constant circuit 76 discharges, decreasing the negative bias on the control grid 31 of the control valve 17. The control valve 17 then becomes conductive at the end of a predetermined interval. When it becomes conductive, the control valve 17 charges the capacitor 83 in the second time constant circuit 51 and thereby impresses a bias on the control circuit of the first power thyratron 7. The first power thyratron 7 then becomes non-conductive and the follow-up circuit associated with the second power thyratron 5 causes the second power thyratron 5 to become non-conductive. The start switch 45 may then be released and the capacitor 25 in the first time constant circuit 76 again charges to reset the apparatus for another operation.

For a further explanation of the operation of this control circuit, reference is made to Fig. 2 of the drawings, which shows the voltage relationships of the various tubes. The three curves are oriented so that the lines A, B and C represent zero voltage. The same time base is used in all of the curves, the representation of voltage at a given time instant on the base line A being directly above the point indicating the same time in curves B and C. The sine wave 84 shown with line A represents the anode voltage of the start valve 15. The curve 85 represents the voltage impressed between the grid 33 and cathode 41 of the start valve 15. The sine wave 87 shown with line B represents the anode voltage impressed on the control valve 17. Voltage impressed between the grid 31 and cathode 79 of the control valve 17 is shown by curve 89. The anode voltage of the first power thyratron 7 is represented by the sine wave 91 drawn on line C. The grid voltage of the first power thyratron 7 is represented by the curve 93.

Initially, before the start switch 45 is closed, the grid voltage 85 is 180° out of phase with the anode voltage 84 of the start valve 15. The negative voltage 85 on the grid 33 prevents the start valve 15 from becoming conductive. At the instant 95, the start switch 45 is closed, the grid voltage of the start valve 15 is advanced sufficiently to permit the start valve 15 to become conductive during each positive half cycle. The start valve 15 becomes conductive at the beginning of the next positive half-cycle after the start switch 45 is closed and becomes conductive during each positive half-cycle as long as the start switch 45 remains closed. Periods of conduction are represented by shaded areas in the drawings.

Initially, the control valve 17 is conductive during a part of each positive half cycle as shown by the first two positive peaks of the curve 87. The grid voltage 89 is just sufficient to fire the control valve 17 during each positive half-cycle. At the instant when the start valve 15 becomes conductive, it draws current through the resistor 77 causing a voltage to be impressed thereacross. The instant at which the negative bias is impressed on the grid 31 is shown by vertical line 97 in the drawings. The control valve 17 is biased to non-conductivity and remains non-conductive until the point 99 at which the capacitor 25 has discharged sufficiently to enable the control valve 17 to become conductive at the beginning of each positive half-cycle. Thus, as shown by curves B, the control valve 17 becomes non-conductive when the start valve 15 becomes conductive, and again becomes conductive when the capacitor 25 has discharged sufficiently.

As shown by the curve C, the grid voltage 93 on the first power thyratron 7 is insufficient to cause it to become conductive during the period in which the control valve 17 is conductive. The grid voltage 93 is a composite wave formed by the addition of the sine wave voltage impressed on the capacitor 57 and the variable voltage impressed on capacitor 83. When the capacitor 83 has been fully charged through the control valve 17, its voltage subtracts from the sine wave voltage and causes the voltage 93 to remain well below zero. When the control valve 17 becomes non-conductive, the capacitor 84 discharges through its associated resistor in the second time constant circuit 51. The grid voltage 93 then rises sharply as the capacitor 84 discharges until the point 101 at which the grid voltage 93 is sufficiently high to cause the thyratron 7 to become conductive at the beginning of its positive half-cycle. The grid voltage 93 continues to cause the thyratron 7 to become conductive at the beginning of each positive half-cycle as long as the control valve 17 remains non-conductive. When the control valve 17 again becomes conductive at the point 99, it rapidly charges the capacitor 84, again impressing a negative bias on the grid of the power thyratron 7.

While we have described the power thyratron 7 as being fired at the beginning of its positive half-cycle, this is not a necessary limitation on our invention since the thyratron 7 can be fired at any point during the positive half-cycle. This thyratron 7, however, must fire at the same instant in its cycle as the thyratron 5 is fired, and it often proves to be a more reliable arrangement when the follow-up circuit fires at the beginning of each positive half-cycle. Our circuit is so arranged that the voltage impressed on the anode of the control valve 17 is advanced somewhat with respect to the voltage impressed on the anode at the start valve 15. This is not, however, a necessary relationship. It does, nevertheless, prevent one type of timing fault. Under certain circumstances, if the start switch is closed after the beginning of the positive half-cycle between the anode 23 and cathode 41 of the start valve 15, the start valve 15 will become conductive at an arbitrary point within a small period of time during which the grid voltage 85 is of sufficient magnitude to cause the start valve to become conductive. Our circuit is so arranged that the control valve 17 cannot become conductive until after the last instant at which the start valve 15 can initiate the first cycle of conduction in the control valve 17. This relationship of starting times is afforded simply by the particular phase relations which we have chosen for the grid voltage 85 and the anode voltage 84 of the start valve 15 and the anode voltage 87 of the control valve 17.

The high accuracy achieved by our circuit is attributable to some extent to the fact that conduction in the power thyratrons 5 and 7 is initiated by the failure of the control thyratron 17 to become conductive during the positive half-cycle of its anode voltage. If the control 17 is a gaseous discharge valve, it fails to become conductive only at one point in its cycle, namely, the point in each cycle at which it has previously started conduction. If, on the other hand, the operation had depended upon the beginning of conduction in the control valve 17, the operation could begin at an arbitrary point in the positive half-cycle since a thyratron can be made to conduct at an arbitrary point in its positive half-cycle. It cannot, however, be made non-conductive again until its anode voltage is made zero. By arranging the control circuit so that the beginning of the conduction of the power valves 5 and 7 is dependent on the time at which the control valve 17 fails to conduct we have provided for precise timing control.

Although we have shown and described a specific embodiment of our invention, we are fully aware that many modifications thereof are possible using the principles herein disclosed. Our invention, therefore, is not intended to be restricted to the specific embodiment shown and disclosed.

We claim as our invention:

1. In combination a first and second electric valve each having an anode, a cathode and a control electrode, terminals for impressing a voltage, a first time-constant circuit connected in series with the anode and cathode of said first electric valve and said terminals, connections between the anode and cathode of said second electric valve and said terminals, and a second time-constant circuit external to said connections connected between the anode of said second electric valve and the control electrode of said first electric valve.

2. In combination a first and a second electric valve each having an anode, a cathode and a control electrode, terminals for impressing an alternating voltage, a first time-constant circuit connected in series with the anode and cathode of said first electric valve and said terminals, connections between the anode and cathode of said second electric valve and said terminals, a second time-constant circuit external to said connections connected between the anode of said second electric valve and the control electrode of said first electric valve, and means for causing said second electric valve to initially become conductive only during the time during which said first electric valve is not conductive.

3. The combination comprising a first electric valve having an anode, a cathode and a control electrode, terminals for impressing between said anode and cathode of said first valve a first alternating potential, a second electric valve having an anode, a cathode and a control electrode, terminals for impressing between said last-named anode and cathode a second alternating potential, means connecting said cathode of said first valve to said cathode of said second valve, a capacitor connected between the anode of said first valve and the control electrode of said second valve, a resistor connected in parallel with said capacitor, means for selectively impressing between said control electrode and said cathode of said first valve either a third potential of magnitude and phase to cause said first valve to become conductive at instants early in the half periods of said first potential when the anode is positive with respect to the cathode of the first valve or a fourth potential of magnitude and phase to maintain said first valve non-conductive and means for impressing between said control electrode and said cathode of said second valve a fifth potential of phase and magnitude to render said second valve conductive during the half periods of said second potential when the anode of said second valve is positive relative to the cathodes, said potentials impressed on said first and second valves being so related that said first valve when rendered conductive by said third potential conducts before said second valve can be rendered conductive by said fifth potential.

4. The combination comprising a first gaseous electric valve having an anode, a cathode and a control electrode, terminals for impressing between said anode and cathode of said first valve a first alternating potential, a second gaseous electric valve having an anode, a cathode and a control electrode, terminals for impressing between said last-named anode and cathode a second alternating potential of the same frequency as said first potential lagging said first potential by a small fraction of a period of said potential, means connecting said cathode of said first valve to said cathode of said second valve, a capacitor connected between the anode of said first valve and said control electrode of said second valve, a resistor connected in parallel with said capacitor, means for impressing between said control electrode and said cathode of said first valve a third potential of such polarity and magnitude that it maintains said first valve non-conductive, and means operable to impress between said control electrode and said cathode of said first valve a fourth potential of such polarity and magnitude to render said first valve conductive early in the positive half periods of said first potential.

5. The combination according to claim 4 characterized by operable means which includes a normally open manual switch which may be closed to connect the fourth potential between the control electrode and cathode of the first valve.

6. The combination according to claim 4 characterized by a resistor which is manually variable.

7. The combination comprising a first electric valve having an anode, a cathode and a control electrode, terminals for connecting said anode and cathode of said first electric valve to a source of voltage, a second electric valve having an anode, a cathode and a control electrode, terminals for connecting said anode and cathode through a time constant circuit to a source of voltage, a capacitor connected between the anode of said first electric valve and the control electrode of said second electric valve, a resistor connected in parallel with said capacitor, means for impressing on the control electrode of said first electric valve a voltage sufficient to cause said first electric valve to become conductive when the anode of the first electric valve is positive with respect to the cathode, a third electric valve having an anode, a cathode and a control electrode, terminals for impressing between said anode and cathode the voltage of said source, and means for connecting said time constant circuit between the cathode and the control electrode of the third electric valve.

8. The combination comprising a first electric valve having an anode, a cathode and a control electrode, terminals for connecting said anode and cathode of said first electric valve to a source of voltage, a second electric valve having an anode, a cathode and a control electrode, terminals for connecting said anode and cathode through a resistor and capacitor in parallel to a source of voltage, a time constant circuit connected between the anode of said first electric valve and the control electrode of said second electric valve, means for impressing on the control electrode of said first electric valve a voltage sufficient to cause said first electric valve to become conductive when the anode of the first electric valve is positive with respect to the cathode, a third electric valve having an anode, a cathode and a control electrode, terminals for impressing between said anode and cathode the voltage of said source, and means for connecting said resistor and capacitor in parallel between the cathode and the control electrode of the third electric valve.

9. Apparatus for controlling the flow of current from a source to a load, comprising in combination a first electric valve having an anode, a cathode and a control electrode, connections between said source and the anode of the first electric valve, connections from the cathode of the first electric valve through the load to the source, a capacitor and a source of biasing voltage connected between the cathode and the grid of the first electric valve, the source of bias voltage being such that it biases the first electric valve to non-conductivity when the polarity of the source is such that the first electric valve would otherwise become conductive, a second electric valve connected in inverse parallel to said first electric valve, a rectifier connected through a resistor to said capacitor so that said rectifier, resistor and capacitor are connected in series across said load, said rectifier being oriented to charge said capacitor to a polarity such that it tends to cause said second electric valve to become conductive.

10. Apparatus for controlling the flow of current from a source to a load, comprising in combination a first electric valve having an anode, a cathode and a control electrode, connections between said source and the anode of the first electric valve, connections from the cathode of the first electric valve through the load to the source, a capacitor and a source of biasing voltage connected between the cathode and the grid of the first electric valve, the polarity of the source of bias voltage being such that it biases the fisrt electric valve to non-conductivity when the polarity of the source is such that the first electric valve would otherwise become conductive, a second electric valve connected in inverse parallel to said first electric valve, a rectifier connected through a resistor to said capacitor so that said rectifier, resistor and capacitor are connected in series across said load, the electrical dimensions of said capacitor, resistor and bias and the orientation of said rectifier being such that said capacitor is charged to a voltage greater than and opposite to the voltage of said bias during one-half cycle.

11. Apparatus for controlling the flow of current from a source to a load, comprising in combination a first electric valve having an anode, a cathode and a control electrode, circuit connections from said source through the anode-cathode circuit of the first electric valve, and the load, a capacitor and a source of biasing voltage connected between the cathode and the grid of the first electric valve, the polarity of the source of bias voltage being such that it biases the first electric valve to non-conductivity when the polarity of the source is such that the first electric valve would otherwise become conductive, a second electric valve connected in inverse parallel to said first electric valve, a rectifier connected through a resistor to said capacitor so that said rectifier, resistor and capacitor are connected in series across said load, the electrical dimensions of said capacitor, and bias being such that said capacitor is charged to a voltage greater than and opposite to the voltage of said bias during one-half cycle, said resistor being variable over a range such that it can be adjusted to enable the charging of said resistor within ½ cycle when the voltage of the source is approximately 460, 230 or 115 volts.

12. In combination a main gaseous electric valve having an anode, a cathode and a control electrode; a first gaseous auxiliary electric valve having an anode, a cathode and a control electrode; a second gaseous auxiliary valve having an anode, a cathode and a control electrode; means for impressing a first alternating potential between the anode and cathode of said main valve; means for impressing a second alternating potential of the same frequency as said first potential but of substantially opposite phase between said anode and cathode of said first valve; means, including voltage-absorbing means, for impressing a third alternating potential of the same frequency as said first potential and lagging in phase relative to said second potential by a small fraction of a period between said anode and cathode of said second valve, said voltage-absorbing means having a positive terminal and a negative terminal when said second valve is conductive; means connecting said cathode of said first valve to said cathode of said second valve; means including a time-constant network connecting the anode of said first valve to the control electrode of said second valve; means for connecting said positive terminal to said cathode of said main valve and said negative terminal to said anode of said main valve; means for impressing between the control electrode and cathode of said first valve a fourth potential to maintain said first valve non-conductive, and means operable at the will of an operator for impressing between said last-named control electrode and cathode a fifth potential to render said first valve conductive early in the positive half periods of said second potential.

13. The combination according to claim 12 characterized by voltage-absorbing means consisting of a resistor shunted by a capacitor.

14. The combination according to claim 12 characterized by means for connecting the positive and negative terminals of the voltage-absorbing means to the cathode and control electrode respectively of the main valve, which connecting means includes means for impressing a fifth alternating potential of the same frequency as the first potential but displaced in phase relative thereto between said last-named control electrode and cathode.

15. In combination a first electric valve having an anode, a cathode and a control electrode; a second electric valve having an anode and a cathode; terminals for impressing a potential; a first time-constant network; a second time-constant network; means for connecting in series said terminals, said anode and cathode of said first valve and said first network; means for connecting in a series circuit said anode and cathode of said second valve and said terminals; and means external to said series circuit and including said second network for connecting said series circuit to said control electrode.

16. In combination an alternating-current potential supply including first, second and third connections, the second connection being electrically intermediate the first and third connections; an electric discharge device having an anode, a cathode and a control electrode; a resistor; a capacitor; switch means; means for connecting said anode to said first connection; means for connecting said cathode to said second connection; means including said resistor for connecting said control electrode to said third connection; and means including said switch means and said capacitor for connecting said resistor between said third connection and said second connection.

References Cited in the file of this patent
UNITED STATES PATENTS

| Number | Name | Date |
|---|---|---|
| 1,947,189 | Cockrell | Feb. 13, 1934 |
| 2,333,363 | Collom | Nov. 2, 1943 |
| 2,442,578 | Audier | June 1, 1948 |
| 2,445,549 | Wittenberg | July 20, 1948 |
| 2,482,892 | Barwick | Sept. 27, 1949 |
| 2,516,422 | Rockafellow | July 25, 1950 |
| 2,540,514 | Elliott | Feb. 6, 1951 |